(12) United States Patent
Chen

(10) Patent No.: US 8,644,019 B2
(45) Date of Patent: Feb. 4, 2014

(54) ELECTRONIC DEVICE WITH COOLING MODULE

(75) Inventor: Qiang Chen, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

(*) Notice: Subject to any disclaimer, the term of this patent is extended or adjusted under 35 U.S.C. 154(b) by 245 days.

(21) Appl. No.: 13/337,256

(22) Filed: Dec. 26, 2011

(65) Prior Publication Data

US 2013/0141864 A1    Jun. 6, 2013

(30) Foreign Application Priority Data

Dec. 2, 2011   (CN) .......................... 2011 1 0394576

(51) Int. Cl.
*H05K 7/20* (2006.01)

(52) U.S. Cl.
USPC ............ 361/679.46; 361/679.48; 361/679.49; 361/690; 361/695; 361/697

(58) Field of Classification Search
None
See application file for complete search history.

(56) References Cited

U.S. PATENT DOCUMENTS

| | | | | |
|---|---|---|---|---|
| 6,813,150 B2* | 11/2004 | King et al. | ............... | 361/679.48 |
| 6,999,315 B2* | 2/2006 | Inoue | ............... | 361/700 |
| 7,002,799 B2* | 2/2006 | Malone et al. | ............... | 361/699 |
| 8,072,753 B2* | 12/2011 | Sun | ............... | 361/695 |
| 8,120,909 B2* | 2/2012 | Fu et al. | ............... | 361/695 |
| 8,456,829 B2* | 6/2013 | Chen et al. | ............... | 361/679.33 |
| 8,508,942 B2* | 8/2013 | Tian et al. | ............... | 361/695 |
| 2008/0068796 A1* | 3/2008 | Pav et al. | ............... | 361/695 |
| 2009/0059515 A1* | 3/2009 | Tsakanikas | ............... | 361/687 |
| 2013/0141865 A1* | 6/2013 | Wu et al. | ............... | 361/679.33 |

* cited by examiner

*Primary Examiner* — Boris Chervinsky
(74) *Attorney, Agent, or Firm* — Altis Law Group, Inc.

(57) ABSTRACT

An electronic device includes a housing. A motherboard is arranged in a first end of the housing. A hard disk drive area is arranged at a second end of the housing. A cooling module is arranged at the housing between the motherboard and the hard disk drive area. The cooling module includes a chassis and a semiconductor chilling plate received in the chassis. An outside airflow flows through the hard disk drive area, and then flows through the semiconductor chilling plate to be cooled. The cooled airflow is driven to flow through the motherboard.

7 Claims, 2 Drawing Sheets

ELECTRONIC DEVICE WITH COOLING MODULE

BACKGROUND

1. Technical Field

The present disclosure relates to electronic devices, and particularly, to an electronic device with a cooling module.

2. Description of Related Art

Mini electronic devices, such as mini computers, are increasingly used in more fields. During operation, the electronic components generate a lot of heat in the housings of the mini electronic devices. A common method for dissipating the heat is to use fans. However, the housing of the mini electronic device is too small to arrange enough fans for heat dissipating.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

Figure 1:
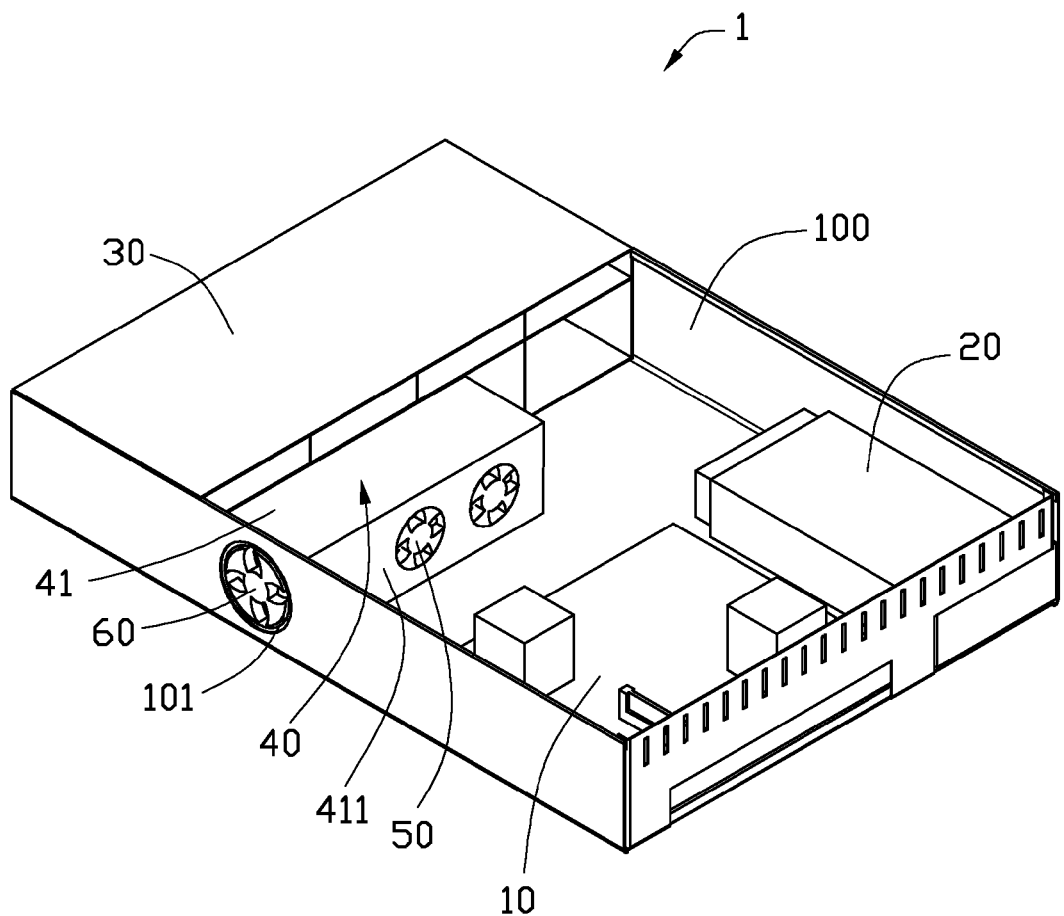
FIG. 1 is an assembled, isometric view of an electronic device, according to an exemplary embodiment, with certain components omitted for clarity.
Figure 2:
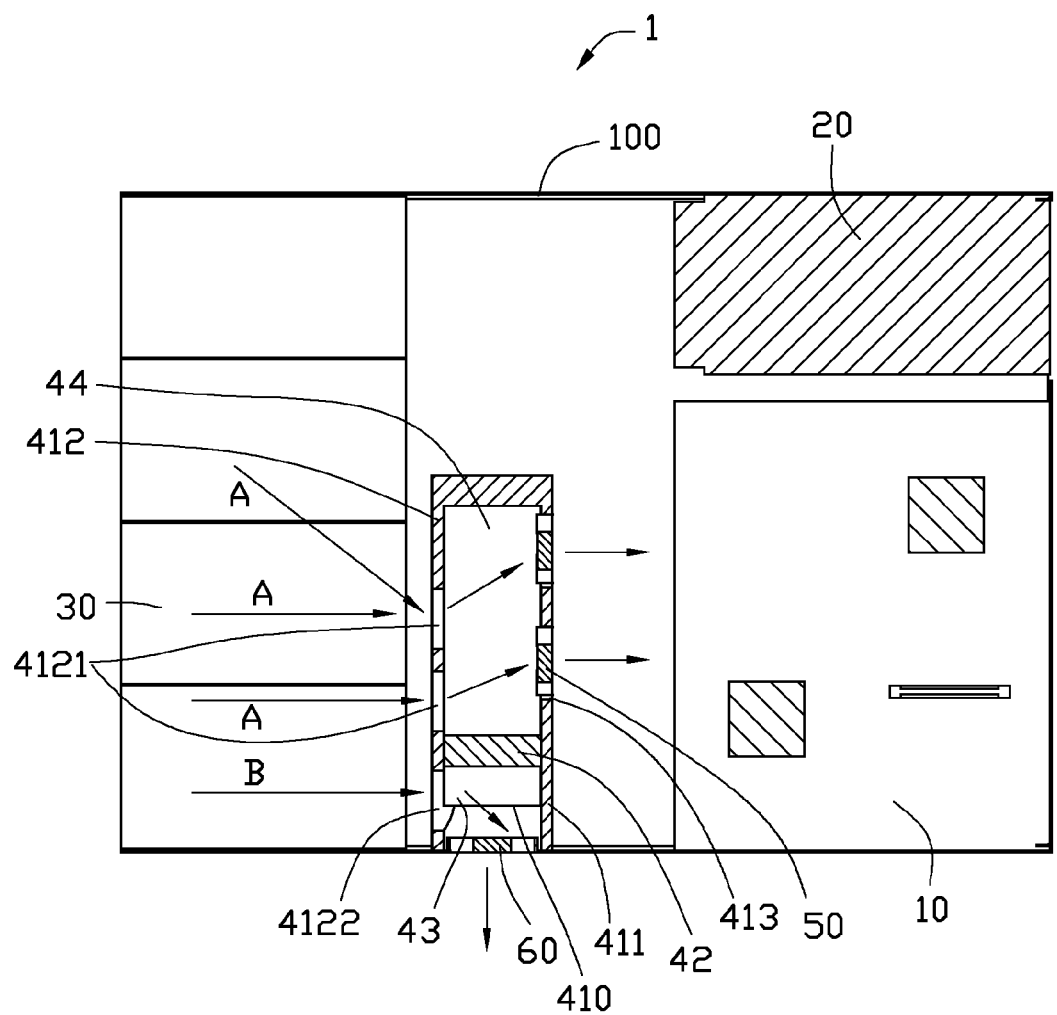
FIG. 2 is a cross-sectional, top plan view of FIG. 1.

Referring to FIG. 1 and FIG. 2, an embodiment of an electronic device 1 includes a housing 100, a motherboard 10 arranged in a first end of the housing 100, a power supply unit 20 arranged in the first end of the housing 100 and adjacent to the motherboard 10, a hard disk drive area 30 located in a second end of the housing 100 for mounting hard disk drives, and a cooling module 40 arranged in a middle of the housing 100 and between the motherboard 10 and the hard disk drive area 30.

The cooling module 40 includes a chassis 41 defining a receiving space 410, and a semiconductor chilling plate 42 received in the receiving space 410. A first heat sink 43 is received in the receiving space 410 and attached to a heat side of the semiconductor chilling plate 42. A second heat sink 44 is received in the receiving space 410 and attached to a cool side of the semiconductor chilling plate 42. The chassis 41 includes a first side plate 411 facing the motherboard 10, and a second side plate 412 facing the hard disk drive area 30. The first side plate 411 defines two through holes 413 aligning with the second heat sink 44 for arranging two first fans 50. The second side plate 412 defines two first inlets 4121 aligning with the second heat sink 44, and a second inlet 4122 aligning with the first heat sink 43. A second fan 60 is placed at one end of the chassis 41 adjacent to the housing 100. The housing 100 defines a through hole 101 aligning with the second fan 60, to expose the second fan 60.

The chassis 41 is made of adiabatic material.

The semiconductor chilling plate 42, the first fans 50, and the second fan 60 are electrically connected to the motherboard 10, to be powered by the motherboard 10. The motherboard 10 can sense the temperature in the housing 100 to adjust the speeds of the first and second fans 50 and 60 and the refrigerating output of the semiconductor chilling plate 42.

When the electronic device 1 operates, a first airflow A coming from outside flows through the hard disk drive area 30 to cool the hard disk drives, then flows into the cooling module 40 through the first inlets 4121 to be cooled by the semiconductor chilling plate 42 and the second heat sink 44. The cooled first airflow A flows to the motherboard 10 through the first fans 50 to cool the motherboard 10.

A second airflow B coming from outside flows through the hard disk drive area 30 to cool the hard disk drives, then flows into the cooling module 40 through the second inlets 4122 to cool the first heat sink 43. The heated second airflow B is guided by the second fan 60 to flow to outside through the through hole 101.

In this embodiment, the electronic device 1 utilizes the semiconductor chilling plate 42 to cool the housing 100, which can dissipate heat effectively and reduce quantity of fans.

Even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. An electronic device comprising:
a housing;
a motherboard arranged at a first end of the housing;
a hard disk drive area arranged at a second end of the housing; and
a cooling module arranged in the housing between the motherboard and the hard disk drive area, the cooling module comprising a chassis and a semiconductor chilling plate received in the chassis;
wherein an outside airflow flows through the hard disk drive area to cool the hard disk drive area, and then flows through the semiconductor chilling plate to be cooled, the cooled airflow is driven to flow through the motherboard.

2. The electronic device of claim 1, wherein a first heat sink is received in the chassis and attached to a heat side of the semiconductor chilling plate, a second heat sink is received in the chassis and attached to a cool side of the semiconductor chilling plate.

3. The electronic device of claim 2, wherein the chassis comprises a first side plate facing the motherboard, and a second side plate facing the hard disk drive area, two first fans are arranged on the first side plate aligning with the second heat sink, the second side plate defines two first inlets aligning with the second heat sink, a first airflow coming from outside flows through the hard disk drive area to cool the hard disk drive area, then flows into the cooling module through the first inlets to be cooled by the semiconductor chilling plate and the second heat sink, the cooled first airflow flows to the motherboard through the first fans to cool the motherboard.

4. The electronic device of claim 3, wherein the second side plate further defines a second inlet aligning with the first heat sink, a second fan is placed at one end of the chassis adjacent to the housing, the housing defines a through hole aligning with the second fan to expose the second fan, a second airflow coming from outside flows through the hard disk drive area to cool the hard disk drive area, then flows into the cooling module through the second inlet to cool the first heat sink, the heated second airflow flows to outside through the second fan and the through hole.

5. The electronic device of claim 4, wherein the semiconductor chilling plate, the first fans, and the second fan are electrically connected to the motherboard to be powered by the motherboard.

6. The electronic device of claim 5, wherein the motherboard senses the temperature in the housing to adjust the speeds of the first and second fans and the refrigerating output of the semiconductor chilling plate.

7. The electronic device of claim 1, wherein the chassis is made of adiabatic material.

* * * * *